March 25, 1969 R. M. BAUMAN 3,435,275
ORTHICON PROTECTIVE CIRCUIT
Filed Nov. 24, 1965
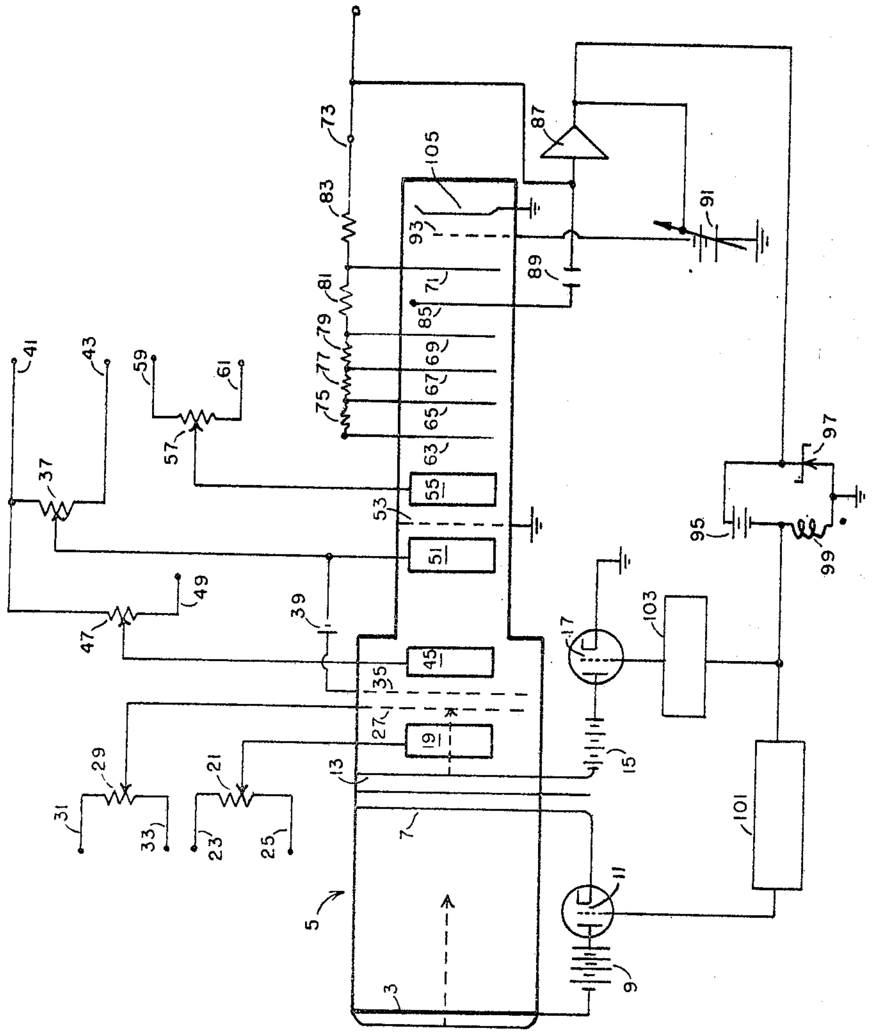
*INVENTOR.*
RONALD M. BAUMAN
*BY*
Arthur L. Collins
ATTORNEY

United States Patent Office 3,435,275

Patented Mar. 25, 1969

3,435,275

ORTHICON PROTECTIVE CIRCUIT

Ronald M. Bauman, 415 Saratoga Drive, Cherry Hill, N.J. 08034

Filed Nov. 24, 1965, Ser. No. 510,145
Int. Cl. H01j 29/41
U.S. Cl. 315—12 4 Claims

ABSTRACT OF THE DISCLOSURE

The disclosed circuit protects a conventional image orthicon from excessive illumination intensity damage by removing the photocathode accelerating potentials in response to illumination exceeding a predetermined level. A normally conducting triode is connected in series with each photocathode power supply. When the illumination intensity exceeds a predetermined level, the automatic beam control circuit output exceeds a predetermined voltage, thereby energizing a threshold circuit connected to the beam control circuit output. Energization of the threshold circuit renders the triode non-conducting so that the photocathode accelerating potentials are removed, thereby preventing damage to the tube structure.

The invention described herein may be manufactured and used by or for the Government of the United States of America for governmental purposes without the payment of any royalties thereon or therefor.

The present invention relates to novel and improved circuitry associated with the image orthicon television camera tube. More particularly, it relates to novel and improved apparatus for automatically protecting an orthicon tube and its associated image intensifier from damage or destruction by high intensity sources of light.

Television pickup or camera tubes are often called upon to transmit scenes varying widely in intensity of illumination, particularly when operation outdoors away from a light-conditioned studio is required. In so doing, the camera tube must occasionally scan scenes subjected to unusually bright illumination, illumination so intense that damage to the sensitive photocathodes and/or the target of the tube may result.

It is, therefore, a principal object of the present invention to provide novel and improved means of safeguarding an image orthicon camera tube from damage or destruction due to exposure to predetermined high intensity sources of light.

It is a further object of the present invention to provide novel and improved means for utilizing the automatic beam control circuitry of an image orthicon tube to protect the tube and its sensitive electrodes and coatings from high intensity sources of light.

Other objects and many of the attendant advantages of this invention will be readily appreciated as the same becomes better understood by reference to the following detailed description when considered in connection with the accompanying drawing wherein:

The single figure of the drawing is a diagrammatic view of a preferred embodiment of the present invention.

Referring now more particularly to the drawing, it will be noted that the first photocathode 3 of the orthicon camera tube 5 is connected to the screen 7 of the second photocathode sandwich assembly through the negative 20,000 volt power supply 9 and the plate circuit of the triode 11. The second photocathode 13 of the orthicon tube is connected to ground through power supply source 15 and the plate circuit of the triode 17. The image accelerator grid 19 of the orthicon tube 5 is connected to the variable arm of the potentiometer 21 which is coupled across the negative 480 volt power supply line 23 and the negative 80 volt power supply line 25. The target electrode 27 of the orthicon tube 5 is connected to the variable arm of the potentiometer 29 which is coupled across the positive 4 volt supply line 31 and the negative 4 volt supply line 33. The field mesh electrode 35 of the orthicon is connected to the variable arm of potentiometer 37 through the 2 volt bias supply source 39. Opposite extremities of potentiometer 37 are connected to the positive 250 volt power supply line 41 and the positive 125 volt power supply line 43. The decelerator grid 45 of the orthicon is connected to the variable arm of potentiometer 47 which is coupled at its opposite extremities to the positive 250 volt power supply line 41 and the negative 100 volt power supply line 49. The beam focusing grid of the orthicon 51 is connected to the junction of the 2 volt bias supply source 39 with the variable arm of potentiometer 37. The suppressor grid 53 of the orthicon 5 is grounded as is shown. The multiplier focusing grid 55 of the orthicon 5 is connected to the variable arm of the potentiometer 57 which is coupled at its opposite extremities to the positive 350 volt power supply line 59 and the positive 215 volt power supply line 61. The dynode grids 63, 65, 67, 69 and 71 in the multiplier section of the orthicon tube 5 are connected to the positive 1300 volt power supply line 73 through resistors 75, 77, 79, 81 and 83 in the manner shown in the drawing. The anode 85 of the orthicon tube 5 is coupled to the input of the automatic beam control circuit 87 through capacitor 89. The junction of anode 85 with capacitor 88 is coupled to the power supply line 73 through resistor 88. The output circuit of the automatic beam control circuit 87 controls the effective potential of the variable bias supply source 91 which is applied to the control grid 93 of the orthicon tube 5. The output circuit of the automatic beam control circuit 87 is also connected to the junction of the voltage source 95 and the Zener diode 97, which together with the inductance coil 99 are connected in series as shown. The junction of the Zener diode 97 and the inductance coil 99 is connected to ground. The junction of the voltage source 95 and the inductance coil 99 is connected to the control grids of triodes 11 and 17 respectively through the pulse amplifiers 101 and 103. The cathode 105 of the orthicon tube 5 is connected to ground.

Inasmuch as the detailed circuitry of the automatic beam control circuit 87 forms no part of the present invention, a detailed description of the same is not provided for the sake of simplicity. For a full understanding of the invention, it need only be understood that the automatic beam control circuit 87 controls the bias potential on the control grid 93 of the orthicon 5 such that the magnitude of the bias potential of source 91 is inversely proportional to the magnitude of the load current that flows through resistor 89. In this way, just enough electrons from the cathode 105 are provided to neutralize the positive charge pattern on the target 27 at all times.

Under normal operating conditions, light from the scene to be televised is focused by an optical lens not shown in the drawing on the first photocathode 3 of the orthicon tube 5. Electrons are emitted from the first photocathode 3 in proportion to the intensity of the optical image at any particular point. These electrons are focused on the second photocathode 13 by a suitable electrostatic focusing device not shown in the drawing. Electrons are then emitted from the second photocathode 13 and are focused on the target 27 of the orthicon 5 by electrostatic and longitudinal magnetic external field coils not shown on the drawing. Secondary electrons produced by the target incident electrons are collected by the fine mesh screen grid 35 which is preferably maintained at a predetermined small positive potential with respect to the target 27. The secondary emission at the target therefore provides a pattern of positive charges which corresponds point by point to the light distribution of the original scene.

The target 27 of the orthicon 5 is then scanned by the electron beam emanating from the electron gun in the scanning section of the tube by external magnetic field coils not shown in the drawing. In relatively negative areas of the target corresponding to the dark areas of the image, the electrons in the beam are deflected back toward the electron gun before they reach the target. In areas corresponding to the illuminated regions of the image where the target is relatively positively charged, the electrons in the beam are deposited on the target until the positive target potential is neutralized and restored to its original state. The portion of the electron beam not required to neutralize the target charge pattern is in this way amplitude modulated in inverse proportion to the brightness of the image and returned toward the electron gun and the various dynode grids of the multiplier section of the orthicon. By means of the phenomenon of secondary emission, the electron beam is amplified and fed through the load resistor 89 and the automatic beam control circuit 87 which automatically adjusts the bias potential of control grid 93 of the orthicon such that the electron beam continuously neutralizes the positive charge pattern on the target 27.

When a given spot or portion of the image to be televised is particularly bright and is apt to burn or otherwise damage the various sensitive panchromatic coatings of the orthicon 5, a relatively high positive charge is established on the target 27 and the electron beam which is redirected back to the anode 85 and through the load resistor 89 and the automatic beam control circuit 87 is substantially decreased. The resulting increased output potential of the automatic beam control circuit 89 then breaks down the Zener diode 97 and current from the electrical energy source 95 flows through the circuit that includes the high inductance coil 99. The signal or pulse developed across the coil 99 is then amplified and inverted in phase by pulse amplifiers 101 and 103 and is respectively coupled to the control grids of the normally conducting triodes 11 and 17. The triodes are then cut-off, the accelerating potentials for the first and second photocathodes 3 and 13 of the orthicon are removed and the tube is protected by being rendered inoperative until the intensity of the light from the image is reduced to a point where continued safe operation is assured. At that predetermined point, the output potential of the automatic beam control circuit 87 no longer causes breakdown of the Zener diode 97, the gate control switches of triodes 11 and 17 are reenergized and the orthicon 5 operates again as described hereinabove until another high intensity light source is encountered.

Although Class C triode circuits and a Zener diode circuit have been disclosed hereinabove, it is to be understood that any other suitable conventional gate control device or threshold sensing device could be used without departing from the spirit or scope of the present invention.

Obviously, many modifications and variations of the present invention are possible in the light of the above teachings. It is therefore to be understood that within the scope of the appended claims, the invention may be practiced otherwise than as specifically described.

What is claimed is:

1. An orthicon camera tube system comprising:
(a) an image intensifier section including a photocathode and a target electrode;
(b) a plate circuit for the photocathode;
(c) a target scanning section including a cathode and a control grid;

(d) an electron multiplier section including a plurality of dynode grids and an anode;
(e) a plate circuit for the multiplier section that includes a load impedance;
(f) an automatic beam control circuit which is coupled across the load impedance in the multiplier section and which controls the bias of the control grid of the target scanning section;
(g) a threshold sensor circuit coupled to the output of the automatic beam control circuit;
(h) a gate control device connected in series in the plate circuit for the photocathode;
(i) and means for coupling the output of the threshold sensor circuit to the input of the gate control device, such that the gate control device is cut off when the threshold sensor circuit is energized.

2. An orthicon camera tube system comprising:
(a) an image intensifier section including a first and a second photocathode and a target electrode;
(b) individual plate circuits for the first and the second photocathodes;
(c) a target scanning section including a cathode and a control grid;
(d) an electron multiplier section including a plurality of dynode grids and an anode;
(e) a plate circuit for the multiplier section that includes a load impedance;
(f) an automatic beam control circuit which is coupled across the load impedance in the multiplier section and which controls the bias of the control grid of the target scanning section;
(g) a threshold sensor circuit coupled to the output of the automatic beam control circuit;
(h) a first gate control device connected in series in the plate circuit of the first photocathode;
(i) a second gate control device connected in series in the plate circuit of the second photocathode;
(j) and means for coupling the output of the threshold sensor circuit to the input of the first and second gate control devices, such that the gate control devices are cut off when the threshold sensor circuit is energized.

3. The apparatus as claimed in claim 2 wherein the threshold sensor circuit includes a Zener diode.

4. The apparatus as claimed in claim 3 wherein the first and second gate control devices are normally energized triodes that are biased to a cut-off condition when the Zener diode breaks down.

References Cited

UNITED STATES PATENTS

| | | |
|---|---|---|
| 2,901,539 | 8/1959 | Morgan. |
| 2,978,537 | 4/1961 | Kruse et al. |
| 3,182,125 | 5/1965 | Kampmeyer et al. |

OTHER REFERENCES

Poehls, RCA Technical Note No. 459, September 1961.

Sarbacher, Encyclopedic Dictionary of Electronics and Nuclear Engineering, 1959, TK7804S37, p. 50.

RODNEY D. BENNETT, *Primary Examiner.*

D. C. KAUFMAN, *Assistant Examiner.*

U.S. Cl. X.R.

178—7.2; 315—10